J. Wilson.
Steam Trap.
N° 57,613.    Patented Aug. 28, 1866.
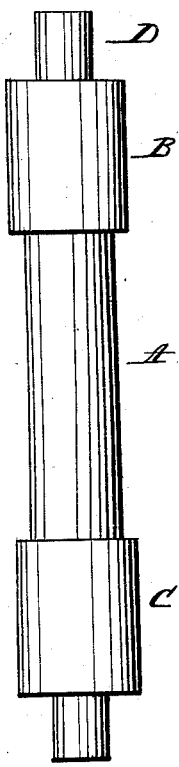
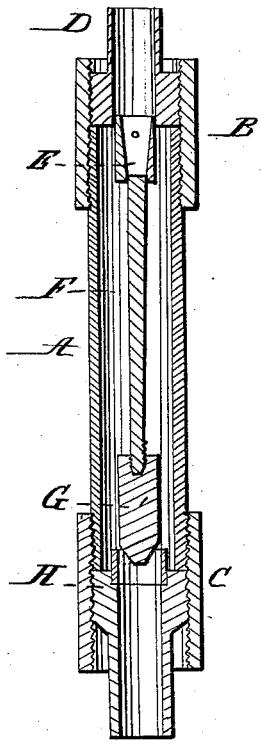
Witnesses:
J. E. Dennis
Jas. M. Fowler
Inventor:
Joseph Wilson
By his Atty.
J. Dennis Jr.

UNITED STATES PATENT OFFICE.

JOSEPH WILSON, OF MANCHESTER, NEW HAMPSHIRE.

IMPROVEMENT IN STEAM-TRAPS.

Specification forming part of Letters Patent No. 57,613, dated August 28, 1866.

*To all whom it may concern:*

Be it known that I, JOSEPH WILSON, of Manchester, Hillsborough county, State of New Hampshire, have invented certain new and useful Improvements in Steam-Traps; and I do hereby declare the following description and accompanying drawings are sufficient to enable any person skilled in the art or science to which it most nearly appertains to make and use my said invention or improvements without further invention or experiment.

The nature of my invention and improvements consists in making the valve of the trap to work into a sleeve or cylinder instead of into or against a valve-seat, said valve being fitted to the sleeve or cylinder so closely as to answer the purpose, and at the same time avoid the risk or danger of bending the expanding rod or tube which operates the valve, or otherwise deranging the trap by the pressure of the valve against its seat.

Prior to my invention steam-traps were made with a valve operated by a tube which was expanded by the heat of the steam, so as to press the valve onto or against its seat. In these traps there was no provision made to allow the tube to expand after the valve reached its seat; hence, when the expansion continued after the valve reached the seat, the tube was bent, or some part of the trap strained or deranged, so as to prevent the further proper action of the trap and cause it to work irregularly. By my improvements, in making the valve to work into a sleeve or cylinder, I have completely overcome the above-mentioned defect and some others.

In the accompanying drawings, Figure 1 is an elevation of my improved steam-trap. Fig. 2 is a section showing it cut centrally.

In the above-mentioned drawings, A is a strong piece of gas-pipe made of iron about three and one-half or four feet long, with a coupling, B, at one end, and C at the other end. I make a tubular piece, D, to screw into the coupling B, with one or more openings, E, for the steam to pass into the pipe A. To the inner end of D, I fasten a rod of brass, F, or some metal that will expand more by the heat of the steam than the iron pipe A. This rod F reaches nearly to the coupling C, and is provided with a valve, G, fitted to enter and traverse in the sleeve or cylinder H, which sleeve is fastened in the coupling C, as shown in Fig. 2. The end of the sleeve H next to the valve is countersunk, and the end of the valve G is conical, to facilitate the entering of the valve into the sleeve. This valve may be fitted very closely in the sleeve by any means in common use, or by grinding it in with oil and emery, in the manner well known to machinists.

The valve should be so adjusted on the rod or the sleeve in its seat that there will be an opening between them when the pipe A and rod F are cold, to let the water from the condensed steam run out between the valve and sleeve, the trap being arranged to receive the water condensed in the steam-pipes or apparatus by being placed below them; but the valve and sleeve should be placed so near together that after the water has run out, the steam enters the pipe and heats the rod F and expands it, and forces the valve G into the sleeve H, and shuts the trap, and prevents the escape of steam or water until the rod F cools, and draws the valve out of the sleeve; and as there is no possibility of the valves stopping in the sleeve, as it would do against a seat, there is no danger of the rods getting bent, or the trap strained, or got out of order.

Although I have described a rod of brass, I contemplate that a cylinder or tube may be used instead of the rod.

What I claim as my invention and improvement in steam-traps is—

1. The arrangement herein set forth, whereby the valve may enter and traverse in its seat, sleeve, or cylinder, and thereby prevent the straining, bending, or otherwise deranging some part of the apparatus.

2. In combination with a valve arranged to enter and traverse in its seat or sleeve, the rod which operates the valve, substantially as described.

JOSEPH WILSON.

Witnesses:
S. M. BELL,
A. P. CHARLES.